(12) United States Patent
Lim

(10) Patent No.: US 11,249,640 B2
(45) Date of Patent: Feb. 15, 2022

(54) ELECTRONIC APPARATUS AND CONTROLLING METHOD THEREOF

(71) Applicant: SAMSUNG ELECTRONICS CO., LTD., Suwon-si (KR)

(72) Inventor: Hyunsig Lim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/849,530

(22) Filed: Apr. 15, 2020

(65) Prior Publication Data
US 2020/0333949 A1   Oct. 22, 2020

(30) Foreign Application Priority Data

Apr. 18, 2019  (KR) ........................ 10-2019-0045606

(51) Int. Cl.
*G06F 3/0488* (2013.01)
*G06F 3/041* (2006.01)
*G09G 3/20* (2006.01)

(52) U.S. Cl.
CPC ........ *G06F 3/04883* (2013.01); *G06F 3/0412* (2013.01); *G09G 3/20* (2013.01); *G09G 2340/045* (2013.01); *G09G 2354/00* (2013.01)

(58) Field of Classification Search
CPC ....... G06F 3/04883; G06F 3/0412; G06F 3/20
See application file for complete search history.

(56) References Cited

U.S. PATENT DOCUMENTS

| 8,280,541 | B1 | 10/2012 | Chen |
| 2011/0273540 | A1 | 11/2011 | Lee et al. |
| 2013/0263002 | A1 | 10/2013 | Park |
| 2013/0275846 | A1 | 10/2013 | Mok et al. |
| 2014/0019905 | A1 | 1/2014 | Kim et al. |
| 2014/0033056 | A1* | 1/2014 | Kim ........................ G06Q 10/10 715/738 |
| 2015/0052067 | A1 | 2/2015 | Thiyagarajan et al. |

(Continued)

FOREIGN PATENT DOCUMENTS

| KR | 10-2011-0123337 A | 11/2011 |
| KR | 10-1735610 B1 | 5/2017 |
| KR | 10-2018-0052302 A | 5/2018 |

(Continued)

OTHER PUBLICATIONS

US 10,007,390 B2, 06/2018, Jung et al. (withdrawn)

(Continued)

*Primary Examiner* — Kent W Chang
*Assistant Examiner* — Chayce R Bibbee
(74) *Attorney, Agent, or Firm* — Sughrue Mion, PLLC

(57) ABSTRACT

An electronic apparatus and a controlling method of the electronic apparatus in which based on a first drawing touch input, a first drawing according to the first drawing touch input is displayed on a first layer for displaying a graphic, based on a first user input for receiving an image from an external device, the image is displayed on the first layer, based on a second user input for generating a second layer, a second layer for performing a second drawing is generated, and based on a user second drawing touch input, the second drawing is displayed on the second layer according to the second drawing touch input.

20 Claims, 18 Drawing Sheets

(56) References Cited

U.S. PATENT DOCUMENTS

2015/0095798 A1    4/2015  Yang et al.

FOREIGN PATENT DOCUMENTS

| KR | 10-2018-0062832 A | 6/2018 |
|---|---|---|
| WO | 2019/039739 A1 | 2/2019 |
| WO | 2019/039866 A1 | 2/2019 |

OTHER PUBLICATIONS

International Search Report (PCT/ISA/210) dated Jul. 14, 2020 issued by the International Searching Authority in International Application No. PCT/KR2020/004788.
Written Opinion (PCT/ISA/237) dated Jul. 14, 2020 issued by the International Searching Authority in International Application No. PCT/KR2020/004788.
Communication dated Sep. 3, 2020, issued by the European Patent Office in European Application No. 20167247.4.

* cited by examiner

ELECTRONIC APPARATUS AND CONTROLLING METHOD THEREOF

CROSS-REFERENCE TO RELATED APPLICATIONS

This application claims priority from Korean Patent Application No. 10-2019-0045606, filed in the Korean Intellectual Property Office on Apr. 18, 2019, the disclosure of which is incorporated herein by reference.

BACKGROUND

1. Field

Aspects of the embodiments relate to an electronic apparatus and a control method thereof and, more particularly, to an electronic apparatus that performs a drawing function and a method of controlling the electronic apparatus to perform the drawing function.

2. Description of the Related Art

With the development of electronic technology, various types of electronic products have been developed and distributed. In particular, various electronic apparatuses such as a TV, a mobile phone, a PC, a notebook PC, a PDA, and the like have been widely deployed in most homes.

Especially, an electronic blackboard device including a drawing function as well as the function of displaying content is now widely used.

The electronic blackboard device is an electronic apparatus that provides the function of drawing using touch. For such a drawing function, drawing speed is the most important factor, and the smaller the time difference between the actual touch and the display of a corresponding line on the screen, the better responsiveness will improve the user experience.

When the screen of the electronic apparatus and the screen of another external device are simultaneously displayed on the display screen, the performance is reduced in the process of compositing the screen of the electronic apparatus and the screen of the external device and displaying the same.

In addition, when a screen received from an external device is displayed on the display, a drawing function cannot be performed on the screen simultaneously received from the external device while a drawing function is performed with respect to the screen provided by the electronic apparatus.

Accordingly, there is a need to simultaneously perform a drawing function both on the screen provided by the electronic apparatus and on the screen received from the external device while maintaining the performance of the drawing function even when the screen is received from the external device.

SUMMARY

Aspects of the embodiments relate to an electronic apparatus that performs a drawing function on the screen received from an external device and on the screen provided by the electronic apparatus simultaneously, and a controlling method thereof.

According to an aspect, there is provided an electronic apparatus including a display, a memory configured to store at least one instruction, and a processor configured to execute the at least one instruction, and the processor is configured to, by executing the at least one instruction, based on a first drawing touch input, to control the display to display a first drawing according to the first drawing touch input on a first layer for displaying a graphic, based on a first user input for receiving an image from an external device, to control the display to display the image on the first layer, based on a second user input for generating a second layer, to generate a second layer for performing a second drawing, wherein the second layer is overlaid on a partial area above the first layer, and based on a second drawing touch input, control the display to display the second drawing on the second layer according to the second drawing touch input.

According to an aspect of an embodiment, there is provided a method of controlling an electronic apparatus including based on a first drawing touch input, displaying a first drawing according to the first drawing touch input on a first layer for displaying a graphic, based on a first user input for receiving an image from an external device, displaying the image and on the first layer, based on a second user input for generating a second layer, generating a second layer for performing a second drawing, wherein the second layer is overlaid on a partial area above the first layer, and based on a second drawing touch input, displaying the second drawing on the second layer according to the second drawing touch input.

DETAILED DESCRIPTION

Figure 1:
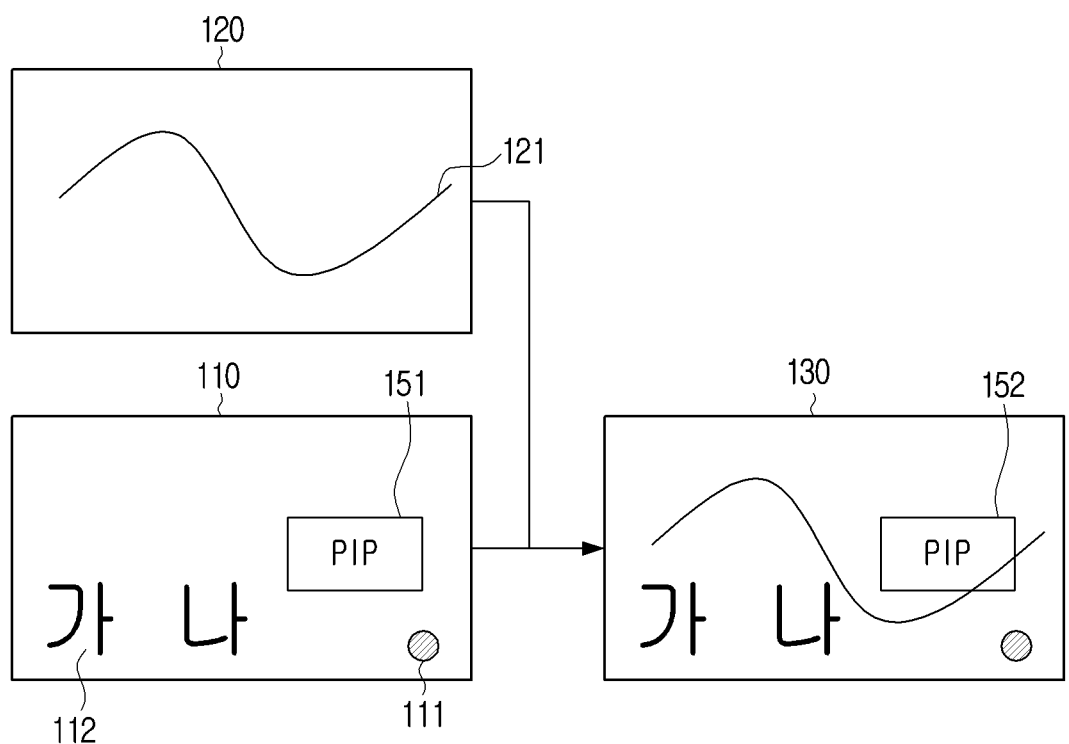
FIG. 1 is a view illustrating a process in which an image is displayed on a display according to an embodiment.

The terms used in this specification will be described briefly, and then the embodiments will be described in detail.

As for the terms used in the embodiments of the disclosure, general terms that are currently used widely were selected in consideration of the functions described in the disclosure. However, the terms may vary depending on the intention of those skilled in the art who work in the pertinent field or emergence of new technologies. Also, in particular configurations, there may be terms that are designated, and in such configurations, the meaning of the terms will be described in detail in the relevant descriptions in the disclosure. Thus, the terms used in the disclosure should be defined based on the meaning of the terms and the overall content of the disclosure, but not just based on the names of the terms.

In the disclosure, terms including an ordinal number such as 'first,' 'second,' etc. may be used to describe various components, but the components are not to be construed as being limited to the terms. The terms are only used to differentiate one component from other components. For example, the first element may be referred to as the second element and similarly, the second element may be referred to as the first element without going beyond the scope of rights of the disclosure. The term 'and/or' includes a combination of a plurality of items or any one of a plurality of terms.

In addition, in the disclosure, singular forms used in the specification are intended to include plural forms unless the context clearly indicates otherwise.

Further, it will be further understood that the terms "comprises" or "have" used in the disclosure, specify the presence of stated features, numerals, steps, operations, components, parts mentioned in this specification, or a combination thereof, but do not preclude the presence or addition of one or more other features, numerals, steps, operations, components, parts, or a combination thereof.

Further, in the disclosure, a 'module' or a 'unit' performs at least one function or operation and may be implemented by hardware or software or a combination of the hardware and the software. In addition, a plurality of 'modules' or 'units' may be integrated into at least one module and may be realized as at least one processor in an integrated manner except for 'modules' or 'units' that should be realized in specific hardware.

Further, in the disclosure, a configuration in which any one part is "connected" with the other part includes a configuration in which the parts are "directly connected" with each other and a configuration in which the parts are "electrically connected" with each other with other elements interposed therebetween.

The term "user touch" in the embodiments may include a touch gesture performed by a user on a display and/or a cover to control a device. In addition, "user touch" may include a touch which is not in contact with the display and is distanced away from the display by more than a predetermined distance (for example, floating or hovering). The user touch may be a touch and hold gesture, a releasing tap gesture after touch, a double tap gesture, a panning gesture, a flick gesture, a touch drag gesture moving in one direction after touch, a pinch gesture or the like but is not limited thereto.

In an embodiment of the disclosure, a "layer" is a virtual image processed to display an image provided from an electronic apparatus or an image received from an external device, and a lay may be stored in a buffer. The electronic apparatus may display an image and the like included in each layer as one composite screen.

In an embodiment of the disclosure, the electronic apparatus may process to include an image or display a drawing in each layer. The drawing refers to lines, dots, etc. displayed on a display in response to a user's touch, and letters, pictures, and the like may be displayed on the display through the drawing.

The term "layer" used in the disclosure is not limited to a specific term, and other terms (e.g., plane, surface, window, etc.) may be used instead of the layer.

In the disclosure the term "user" may refer to a person who uses or controls an electronic apparatus or an apparatus (e.g., an artificial intelligence (AI) electronic apparatus) that uses or controls the electronic apparatus.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined in the various embodiments.

FIG. 1 is a view illustrating a process in which an image is displayed on a display according to an embodiment.

An electronic apparatus may process to display a graphic, a video and a first drawing image on a first layer 110.

The first layer 110 is a layer for including a video and a graphic, and FIG. 1 is an embodiment in which the first layer 110 is one layer. The graphic means all images except for a video included in an image, and may include a drawing icon 111, a menu user interface (UI) and the like.

A second layer 120 is a layer that is generated based on a second user input for generating a second layer after an image is received from an external device according to an embodiment, and if a user input for generating a second layer is received, the electronic apparatus may generate the second layer 120 and display a second drawing according to a user's drawing touch input on the second layer 120, wherein the second layer is overlaid on a partial area above the first layer. In addition, the second drawing image displayed on the second layer 120 may be directly displayed on the display without composting the drawing image with a received image. Thus, the drawing performance can be maintained even when an image is received from an external device.

If a user's drawing touch is input on the display before an image is received from an external device, the electronic apparatus may display a first drawing according to the user's drawing touch on the first layer 110.

If a user input for receiving an image from an external device is received, the electronic apparatus may display a received image 151 and the drawing icon 111 on the first layer 110. If the user's drawing touch is input in an area in which the received image is not displayed before the drawing icon 111 is selected, the electronic apparatus may display a first drawing 112 on the first layer 110 according to the user's drawing touch.

The first drawing displayed on the first layer 110 should be displayed on the display after compositing with the received image. In other words, when a first drawing 112 is displayed on the first layer 110, the first drawing image 112 is composited with a received image 151 displayed on the first layer 110. Thus, drawing performance may decrease due to a large time difference (latency) between the actual user's touch and the line displayed on the screen.

In addition, when the first drawing is displayed on the first layer 110, continuous drawing on the area in which the received image is displayed and other areas may be difficult. In other words, if the electronic apparatus displays the first drawing 112 on the first layer 110, the drawing according to the user touch is displayed only in an area excluding the area in which the received image is displayed. Thus, processing for continuous drawing on the area in which the received image is displayed and other areas may be difficult, which will be described in detail later with reference to FIG. 6A.

If a user input for selecting the drawing icon 111 is received, the electronic apparatus may generate the second layer 120 for performing a second drawing, wherein the second user input is a user input for selecting the drawing icon 111. And when the user's drawing touch is input, the electronic apparatus may display the second drawing 121 corresponding to the user's drawing touch on the second layer 120. The second drawing 121 displayed on the second layer 120 may be displayed directly on the display without performing processing of compositing with the received image 151.

In other words, the first drawing 112 included in the first layer 110 and the received image 151 are displayed on the display as the full screen 130 through a composite process, but the second drawing 121 included in the second layer 120 may be directly displayed on the full screen 130 without the composite process, thereby maintaining the drawing performance. In addition, when a second drawing is displayed on the second layer 120, continuous drawing with respect to the area 152 in which the received image is displayed and other areas may be continuously performed, which will be described in detail later with respect to FIG. 6B.

In FIG. 1, the first layer 110 is described as one layer but the first layer 110 is not limited to only such single layer. In other words, as described later with reference to FIGS. 5A to 5D, the first layer may be implemented as a video layer for displaying a video or a graphic layer for displaying a graphic other than the video.

According to the above-described various embodiments of the disclosure, the electronic apparatus may perform a drawing simultaneously with respect to the screen received from an external device and the screen provided by the electronic apparatus without degrading drawing performance even when an image is received from the external device.

According to the above-described various embodiments of the disclosure, the electronic apparatus may maintain the performance of a drawing function even when a screen received from an external device is provided, and simultaneously perform a drawing with respect to the screen regarding the external device and the screen provided by the electronic apparatus, thereby enhancing user convenience.

Figure 2:
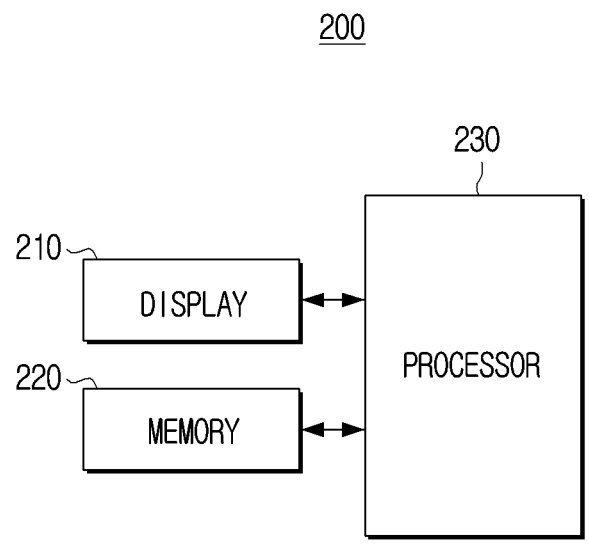
FIG. 2 is a block diagram illustrating configuration of an electronic apparatus according to an embodiment.

FIG. 2 is a block diagram illustrating configuration of an electronic apparatus according to an embodiment.

Referring to FIG. 2, an electronic apparatus 200 includes a display 210, a memory 220 and a processor 230. Here, the electronic apparatus 200 may be implemented as various types of electronic apparatuses such as a TV, an electronic blackboard, an electronic table, a Large Format Display (LFD), a smartphone, a tablet PC, a desktop PC, a notebook computer, and the like. The electronic blackboard means a conductive blackboard including the functionality for a user to write with an electronic pen, and the surface of the electronic blackboard is a conductive plane to receive the input via an electronic pen.

The electronic apparatus 200 according to an embodiment may be implemented not only as an electronic blackboard but also as a general TV, an electronic table, a smartphone, a tablet PC, etc. that may perform an electronic blackboard function.

The display 210 may display various objects such a still image, a photo, a document, etc., which are generated as a plurality of images such as a movie, a drama, a recorded image, a slow video, etc. In addition, the display 210 may display a user interface screen including various menus.

In particular, the display 210 may display a writing screen providing an electronic blackboard function. The writing screen providing an electronic blackboard function may be displayed on the display 210 as a black or white screen, and the transparency may be adjusted and a transparent screen may be provided. In addition, the electronic blackboard function may mean all functions performed in a general electronic blackboard device.

The display 210 may be implemented as a Liquid Crystal Display (LCD), an Organic Light Emitting Display (OLED), a Plasma Display Panel (PDP), etc., but is not limited thereto.

The memory 220 may store commands or data related to at least one another element of the electronic apparatus 100. In particular, the memory 220 may be implemented as an internal memory such as a ROM (e.g., electrically erasable programmable read-only memory (EEPROM), a RAM, etc. included in the processor 230, or as a memory separate from the processor 230. In this configuration, the memory 220 may be implemented in the form of a memory embedded in the electronic apparatus 100 according to a data storage purpose, or may be implemented in the form of a memory detachable from the electronic apparatus 100. For example, in the configuration of data for driving the electronic apparatus 100, the data may be stored in a memory embedded in the electronic apparatus 100 And, in the configuration of data for an expansion function of the electronic apparatus 100, the data may be stored in a memory detachable from the electronic apparatus 100. Meanwhile, the memory embedded in the electronic apparatus 100 may be implemented as at least one of a volatile memory (e.g., dynamic RAM (DRAM), static RAM (SRAM), or synchronous dynamic RAM (SDRAM, and the like), a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., NAND flash or NOR flash, etc.), hard drive, or sold state drive (SSD), and the memory detachable from the terminal device 100 may be implemented in the form of a memory card (e.g., compact flash (CF), secure digital (SD), micro secure digital (Micro-SD), mini secure digital (Mini-SD), extreme digital (xD), multi-media card (MMC), etc.), an external memory connectable to a USB port (e.g., a USB memory), and the like.

In particular, the memory 220 stores a program for performing an electronic blackboard function, which may be executed under control of the processor 230 to cause the electronic apparatus 200 to perform the blackboard function. In order to provide a screen for performing an electronic blackboard function on the above-described display 210, a program for performing the electronic blackboard function stored in the memory 2220 should be executed in the processor 230. The program for performing the electronic blackboard function may be stored in the electronic apparatus 200 when the electronic apparatus 200 is designed, but may be updated in the form of firmware. The update in the form of firmware may be performed by wire ore wireless communication.

In addition, an image file for the full screen including a drawing may be stored in the memory 220, and the second layer may be stored in the front buffer of the memory 220.

The processor 230 may include one or more of a central processing unit (CPU) processing a digital signal, a Micro Controller Unit (MCU), a micro processing unit (MPU), a controller, an application processor (AP) or a communication processor (CP), and an ARM processor, or may be defined as the corresponding term. In addition, the processor 230 may be implemented as a system on chip (SoC) having a processing algorithm stored therein or large scale integration (LSI), or in the form of a field programmable gate array (FPGA). The processor 230 may perform various functions by executing computer executable instructions stored in the memory 220. In particular, the processor 230 may be electrically connected to the memory 220 to control the overall operations and functions of the electronic apparatus 100.

The processor 230 may control the overall operations of the electronic apparatus 200.

When a user's drawing touch is input, the processor 230 may process to display a drawing according to the user's drawing touch input on a first layer for displaying a graphic.

When a first user input for receiving an image from an external device is received, the processor 230 may process to display the received image and a drawing icon on the first layer. The external device may be any device that is a source of the image.

If an image is received from an external device and then a drawing touch is input on an area in which the received image is not displayed before the drawing icon is selected, the processor 230 may process to display a drawing on the first layer according to the drawing touch input. When the drawing is displayed on the first layer, a drawing according to the user's drawing touch may be displayed on an area other than the area in which the received image is displayed.

In addition, if a user touch is input on the received image before the drawing icon is selected, the processor 230 may control a communicator 250 to transmit a touch command corresponding to the user touch to an external device without performing a drawing. In other words, in order to correspond to the user touch of selecting an icon on the received image, the processor 230 may control the communicator 250 to transmit a command corresponding to the icon to the external device.

When the drawing icon is selected, the processor 230 may generate a second layer for performing a drawing. Subsequently, if a user's second drawing touch is input, the processor 230 may control the display 210 to display a drawing on the second layer according to the user's second drawing touch input. When the processor 230 processes to display a drawing on the second layer, the drawing displayed on the second layer does not execute a composite process with the received image. Thus, even if an image is received from the external device, the electronic apparatus 200 may maintain drawing performance. In addition, as the drawing can be displayed in the entire area of the display 210, when the processor 230 processes to display the drawing on the second layer, the drawing may be continuously performed for the entire screen.

In addition, after the drawing icon is selected, if a third user input for generating an image file, the processor 230 may generate the image file regarding the entire screen including the drawing. In other words, if the drawing icon is selected again, the drawing image, the video image and the graphic image at the time when the drawing icon is selected may be captured and generated as one image file. In addition, if a third user input for generating an image file, the processor 230 may control the display 210 to display a user interface (UI) for identifying whether to generate the image file regarding the entire screen including the drawing, which will be described in detail later with reference to FIG. 7.

When a user input for selecting the drawing icon is received, the processor 230 may control the display 210 to adjust the transparency of the entire area of the display screen and display the display screen, which will be described in detail later with reference to FIG. 8.

In addition, the processor 230 may control the display 210 to display the received image in one area of the display in the form of one of Picture In Picture (PIP) and Picture By Picture (PBP), which will be described in detail later with reference to FIGS. 9A-B.

Figure 3:
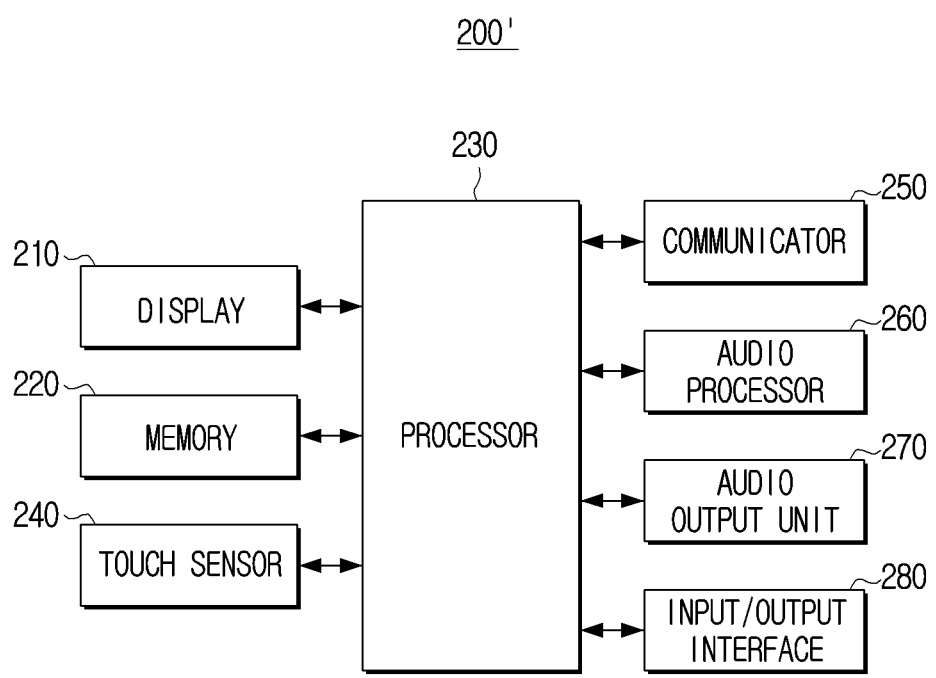
FIG. 3 is a block diagram illustrating a detailed configuration of an electronic apparatus according to an embodiment.

FIG. 3 is a block diagram illustrating a detailed configuration of an electronic apparatus according to an embodiment.

Referring to FIG. 3, an electronic apparatus 200' may include the display 210, the memory 220, the processor 230, a touch sensor 240, a communicator 250, an audio processor 260, an audio output unit 270, and an input/output interface 280. The detailed description of the components of FIG. 3 overlapping with those in FIG. 2 will be omitted.

The touch sensor 240 may sense a drawing input on the display 210. The drawing input may be input to the electronic apparatus by a user touch, and the user touch include a touch input by a user's finger and a touch input by an electronic pen.

In the configuration of a touch input by a user's finger, the touch sensor 240 senses the touch input and outputs a touch even value corresponding to a sensed touch signal. In this configuration, information corresponding to the touch signal may be displayed on the display 210.

In the configuration of a touch input by an electronic pen, the touch sensor 240 senses a proximity input or a contact input of the electronic pen according to the operation of the electronic pen, and outputs a sensed electronic pen proximity event or an electronic pen contact event. The communicator 250 is configured to perform communication with various types of external devices according to various types of communication methods. The communicator 250 may include a WiFi chip, a Bluetooth chip, a wireless communication chip, and an NFC chip. The processor 230 performs communication with various external devices using the communicator 250.

In particular, the WiFi chip and the Bluetooth chip perform communication according to a WiFi protocol and a Bluetooth protocol, respectively. In the configuration of using the WiFi chip or the Bluetooth chip, various connection information such as SSID, a session key, etc. may be transmitted and received first, and communication may be established based thereon, and then various kinds of information may be transmitted and received. The wireless communication chip refers to a chip that performs communication according to various communication standards such as IEEE, Zigbee, 3rd Generation (3G), 3rd Generation Partnership Project (3GPP), Long Term Evolution (LTE), etc. The NFC chip refers to a chip which operates in a Near Field Communication (NFC) method using a 13.56 MHz band among various RF-ID frequency bands such as 135 kHz, 13.56 MHz, 433 MHz, 860-960 MHz, 2.45 GHz, etc.

The communicator 250 may perform communication with an external device, and receive an image from the external device. The image received from the external device may include a graphic image, a video image and audio data.

The audio processor 260 is configured to process audio data of image contents. The audio processor 260 may perform various processing such as decoding, amplification, noise filtering, etc. with respect to audio data. The audio data processed by the audio processor 260 may be output to the audio output unit 270.

According to an embodiment, when an image is received from an external device and audio is included in the received image, the audio processor 260 may perform processing with respect to the audio data. In addition, even in the configuration in which the screen provided by the electronic apparatus includes audio, the audio processor 260 performs processing with respect to the audio data.

The audio output unit 270 is an element that outputs various audio data with which various processing operations have been performed such as decoding, amplification, and noise filtering by the audio processor 260 and also various notification sounds or voice messages. In particular, the audio output unit 270 may be implemented as a speaker, but this is only an example. The audio output unit 270 may be implemented as an output terminal capable of outputting audio data.

According to an embodiment, if audio is included in an image of an external device or in a screen provided by an electronic apparatus, the audio data processed by the audio processor 260 may be output.

The input/output interface 280 may input/output at least one of an audio signal or an image signal. In particular, the input/output interface 280 may receive an image including at least one of a content or a UI from an external device and output a control command to the external device.

Meanwhile, the input/output interface 280 may be High Definition Multimedia Interface (HDMI), but this is only an example, and the input/output interface 280 may be one Mobile High-Definition Link (MHL), Universal Serial Bus (USB), Display Port (DP), Thunderbolt, Video Graphics Array (VGA) port, RGB port, D-subminiature (D-SUB), and Digital Visual Interface (DVI). According to an embodiment, the input/output interface 280 may include a port that inputs/outputs only an audio signal and a port that inputs/outputs only an image signal as separate ports, or a single port that inputs/outputs both an audio signal and an image signal.

Accordingly, the electronic apparatus 200 may receive an image from an external device through the input/output interface 280 or the communicator 250. The image received from the external device may include a graphic image, a video image and audio data.

Figure 4:
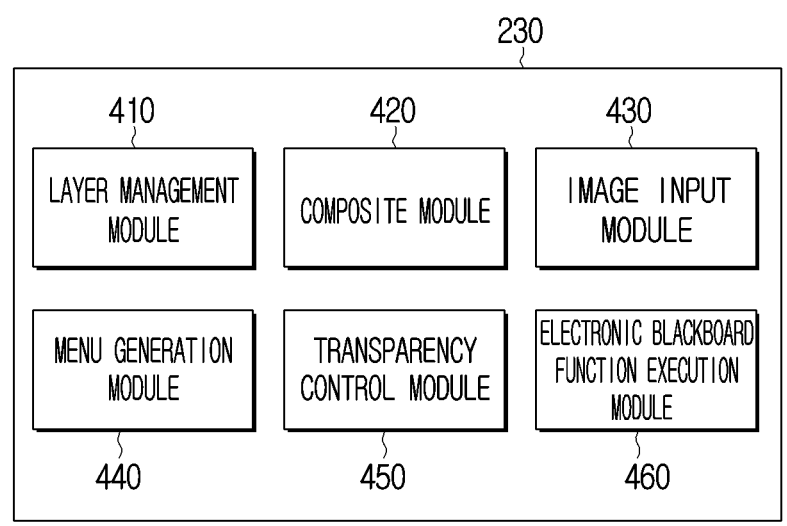
FIG. 4 is a block diagram illustrating software stored in a memory of an electronic apparatus according to an embodiment.

FIG. 4 is a block diagram illustrating software stored in the memory 220 according to an embodiment.

Referring to FIG. 4, the memory 220 may store programs such as a layer management module 410, a composite module 420, an image input module 430, a menu generation module 440, a transparency control module 450, an electronic blackboard function execution module 460, etc.

Meanwhile, the operations of the above-described processor 230 may be performed when executing a program stored in the memory 220. However, this is only an example, and at least one module may be implemented as hardware.

Hereinafter, the specific operation of the processor 230 using a program stored in the memory 220 will be described in detail.

According to an embodiment, when the electronic apparatus 200 is executed, the layer management module 410 may generate a first layer for displaying a graphic and a video.

According to an embodiment, when a drawing icon is selected, the layer management module 410 may generate a second layer for performing a drawing, and when the drawing icon is selected again, the layer management module may delete the second layer.

The composite module 420 may perform the function of compositing a drawing image, a graphic, a video, etc. included in the first layer. In other words, the drawing image included in the first image should be displayed on the display after executing the process of compositing with the received image. When the drawing is displayed on the first layer by the composite process, drawing performance may be degraded.

According to an embodiment, the composite module 420 may check whether there is the first layer in a composite standby state. The composite module 420 may be triggered by a vsync generated every 16.6 ms when the frame rate is 60 Hz, and may check whether there is a layer in the composite standby state. If there is no layer in the composite standby state, the composite module 420 may enter a sleep state until the next vsync, and generate one composite screen in which there is a layer in the composite standby state.

According to an embodiment, the composite module 420 may perform compositing using a graphic library. The graphic library may include, for example, OpenGL ES, Direct3D, Stage3D and the like.

According to an embodiment, the composite module 420 may generate one composite screen by compositing a drawing image, a graphic and videos included in the first layer. The generated composite screen may be displayed on the display 210 by the processor 230.

However, the drawing image which is processed to be displayed on the layer stored in the front buffer may be displayed on the display 210 directly without performing the compositing process by the composite module 420. According to an embodiment, when an image is received from an external device, the process of compositing the received image included in the first layer, the image provided by the electronic apparatus and the drawing image is required. Thus, the first layer cannot be stored in the front buffer. In other words, when an image is received from an external device and the processor 230 processes to display a drawing on the first layer, the time difference between the actual touch and the drawing displayed on the screen becomes large, thereby compromising drawing performance.

Accordingly, when the drawing icon is selected, the processor 230 may generate the second layer stored in the front buffer. The drawing image displayed on the second layer may be displayed directly on the display 210 without a composite process. Thus, even if an image is received from an external device, the processor 230 may perform a drawing without degrading drawing performance (without latency) by processing to display the drawing on the second layer.

The image input module 430 may receive an image from an external device and perform the function of displaying the image received from the external device on the display 210. In other words, when a user input for receiving an image from an external device is received, the image input module 430 may receive an image received from the communicator 250 or the input/output interface 280 and process to display the image on the display 210. The image received from the external device may include a video, a graphic and the like.

The menu generation module 440 may perform the function of generating a drawing icon for performing a drawing, a menu necessary for performing an electronic blackboard function and a UI for identifying whether to generate an image file.

According to an embodiment, when the electronic apparatus 200 receives an image of an external device through the communicator 250 or the input/output interface 280, the menu generation module 440 may generate a drawing icon for performing a drawing, and the processor 230 may control the display 210 to display a drawing icon on one area of the display 210.

In addition, the menu generation module 440 may generate a control menu for an external device when an image of the external device is received. Through a control menu generated by the menu generation module 440, a user may easily control an external device connected to the electronic apparatus 200.

In addition, the menu generation module 440 may generate menus for an electronic apparatus to perform an electronic blackboard function.

The transparency control module 450 may perform the function of adjusting the transparency of the screen displayed on the display 210.

According to an embodiment, when a drawing icon is selected and a second layer is generated, the transparency control module 450 may adjust the transparency for the received image, the drawing image, etc. included in the first layer, and may not adjust the transparency for the drawing displayed on the second layer. In this configuration, the drawing displayed on the second layer may appear more clearly than other videos and graphics and thus, a user may easily grasp the trajectory of the drawing displayed on the display 210.

In addition, when the screen provided by the electronic apparatus 200 includes a background screen, the transparency control module 450 may adjust the transparency of the background screen.

The electronic blackboard function execution module may be a program itself for executing the electronic blackboard function, or may be a platform program for executing a program for executing the electronic blackboard function. In other words, the electronic blackboard function execution module 460 may include all software and the like for executing the electronic blackboard function.

According to an embodiment, the electronic blackboard function execution module 460 may perform the function of generating the screen displayed on the display 210 as an image file.

According to an embodiment, when a user performs a drawing function by selecting a drawing icon and presses the drawing icon once again to finish the drawing function, the electronic blackboard function execution module 460 may generate the graphics, images, drawing images, etc. displayed on the first layer and the second layer as one image file, and the generated image file may be stored in the memory 220.

As such, the processor 230 may display an image received from an input device on one area of the screen using various software modules stored in the memory 220, and perform a continuous drawing function with respect to the drawing screen provided by an electronic apparatus and the received image screen.

Figure 5A:
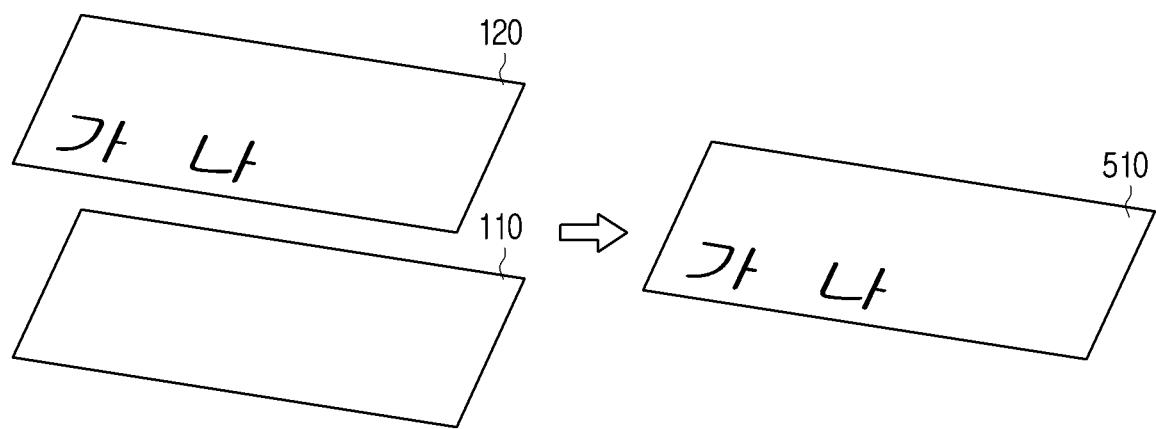
FIG. 5A is a view illustrating a plurality of layers before an image is received from an external device according to an embodiment.

FIG. 5A is a view illustrating a plurality of layers before an image is received from an external device according to an embodiment.

Figure 5B:
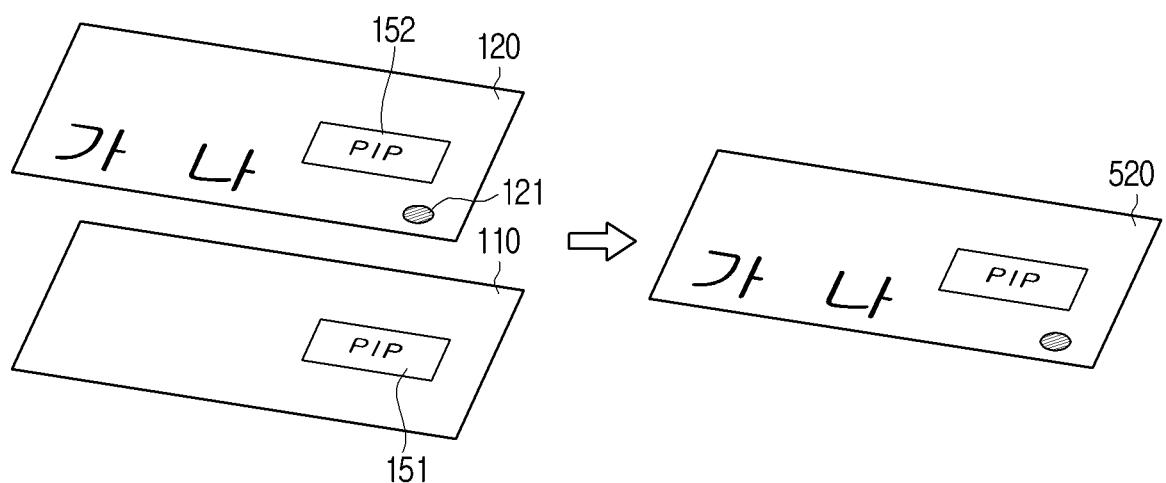
FIG. 5B is a view illustrating a plurality of layers after an image is received from an external device according to an embodiment.
Figure 5C:
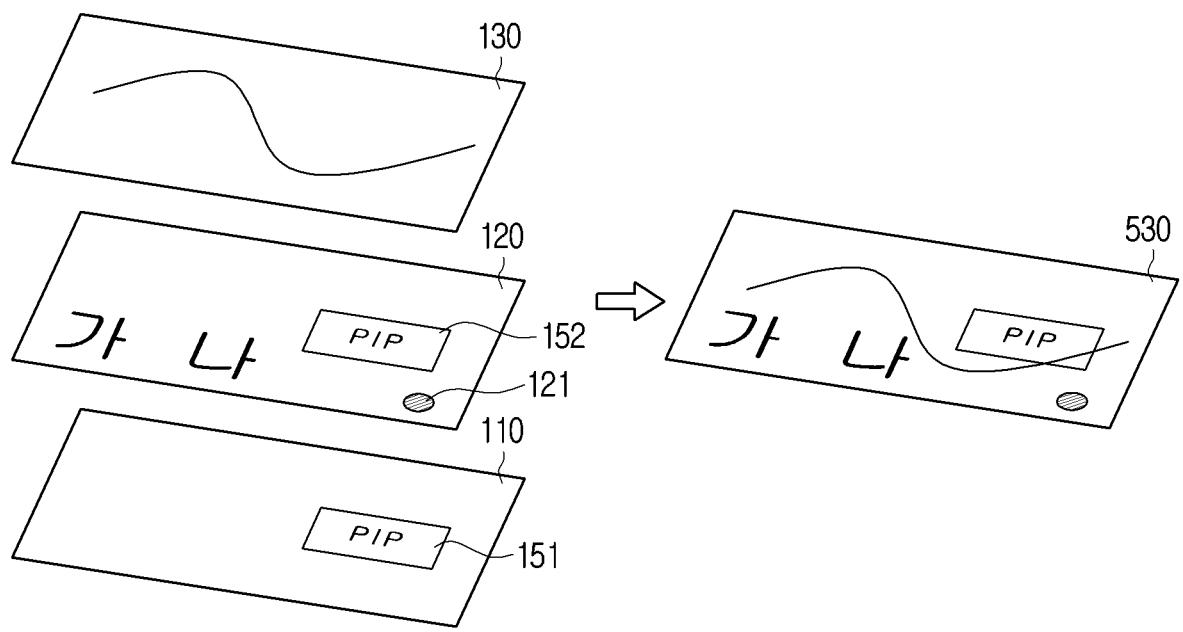
FIG. 5C is a view illustrating a plurality of layers after an image is received from an external device and a drawing icon is selected according to an embodiment.

Before an image is received from an external device, the processor 230 may control the display 210 to display a screen provided by the electronic apparatus 200 on a layer. FIGS. 5A to 5C illustrate configurations in which the first layer consists of the video layer 110 and the graphic layer 120. The video layer 110 is a layer for displaying a video, and the graphic layer 120 is a layer for displaying a graphic and menus, icons, images, etc. other than videos may be displayed on the graphic layer 120.

Referring to FIG. 5A, the processor 230 may process to display a drawing on the graphic layer 120 according to a user's drawing touch before an image is received from an external device.

In addition, when a video and a graphic provided by the electronic apparatus 200 itself are included in the video layer 110 and the graphic layer 120 (not illustrated), the processor 230 may process to display the video provided by the electronic apparatus 200 on the video layer 110, and the graphic and drawing image provided by the electronic apparatus 200 on the graphic layer 120. In this configuration, the display 210 may be controlled to synthesize the video, graphic and drawing image displayed on the video layer 110 and the graphic layer 120 and display the same as one synthesized screen 510.

FIG. 5B is a view illustrating a plurality of layers after an image is received from an external device according to an embodiment.

When an image is received from an external device, the processor 230 may process to display a video 151 included in the received image on the video layer 110, and process to display a graphic 152 included in the received image on the graphic layer 120. In addition, the processor 230 may process to display a drawing icon 121 for performing a drawing on the graphic layer 120.

If a user touch is input on the area in which the received image is displayed before the drawing icon 121 is selected, the processor 230 may not perform a drawing and control the communicator 250 to transmit a touch command corresponding to the user touch to the external device.

If a user touch is input on the area in which the received image is not displayed before the drawing icon 121 is selected, the processor 230 may process to display a drawing on the graphic layer 120.

The processor 230 may control the display 210 to synthesize the graphic, video and drawing image included in the video layer 110 and the graphic layer 120 and display the same as one synthesized image 520.

FIG. 5C is a view illustrating the video layer 110, the graphic layer 120 and the second layer 130 after an image is received from an external device and the drawing icon 121 is selected according to an embodiment.

When the drawing icon 121 is selected, the processor 230 may generate the second layer 130 for performing a drawing. Subsequently, when a user's drawing touch is input, the processor 230 may process to display a drawing on the second layer 130 according to the user's drawing touch input.

The processor 230 may control the display 210 to include the drawing image displayed on the second layer 130 in the synthesized screen 530 in which the graphic, drawing image and video included in the video layer 110 and the graphic layer 120 are synthesized to display one screen 530. In other words, the drawing image displayed on the second layer 130 may be displayed on the one screen 530 directly without going through the synthesis process.

However, according to an embodiment, when the drawing icon 121 is selected, a drawing may be selectively displayed on the graphic layer 120 or the second layer 130 according to a user input. For example, if the drawing icon 120 is selected, and a user's scroll input is received while a drawing is displayed on the second layer 130 according to the user's drawing touch input, the drawing may be displayed on the graphic layer 120 according to the user's drawing touch input. In other words, when an image is received from an external device, and the drawing icon 121 is selected, the processor 230 may selectively scroll the graphic layer 120 or the second layer 130 according to the user's scroll input, and process to display the drawing on the graphic layer 120 or the second layer 130.

Figure 5D:
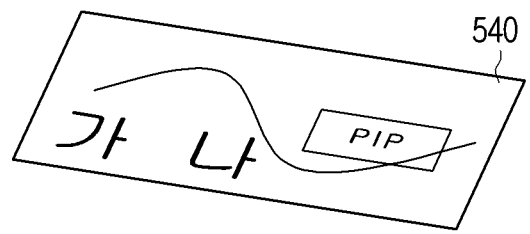
FIG. 5D is a view illustrating an image file regarding an entire screen including a drawing.

FIG. 5D is a view illustrating an image file with respect to a screen in which a drawing is performed.

After the drawing icon is selected, the processor 230 performs a drawing according to the user's drawing touch input, and when the drawing icon is selected again, the processor 230 may generate the image file 540 with respect to the full screen including the drawing. In other words, if the drawing icon is selected again and the drawing function is finished, the processor 230 may generate one image file 540 with the image, the graphic and the drawing image included in each layer and store the same in the memory 220.

In FIG. 5A to 5D, it is described that the first layer consists of two layers (a graphic layer and a video layer) but the first layer is not limited thereto. A video and a graphic may be included in one layer, or more than two layers may be used.

Figure 6A:
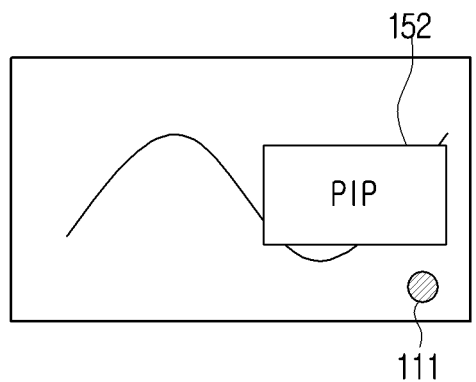
FIG. 6A is a view illustrating a configuration in which a drawing is not displayed on an area in which a received image is displayed.
Figure 6B:
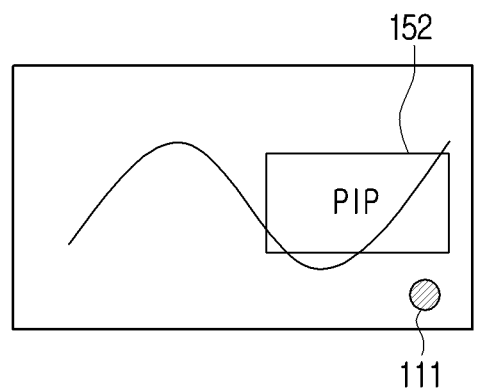
FIG. 6B is a view illustrating a configuration in which a drawing is displayed on an area in which a received image is displayed.

FIG. 6A is a view illustrating a configuration in which a drawing is not displayed on the area in which a received image is displayed, and FIG. 6B is a view illustrating a configuration in which a drawing is displayed on the area in which a received image is displayed.

Referring to FIG. 6A, when an image is received from an external device, and the drawing icon 111 is not selected, and when a user touch is input in an area which is not the area 152 in which a received image is displayed, the processor 230 may process to display a drawing on the first layer. In this configuration, when a touch is initiated in an area which is not the area 152 in which the received image is displayed and is dragged to the area 152 in which the received image is displayed, the processor 230 may process not to display the drawing on the area 152 in which the received image is displayed. In other words, the drawing according to the user touch is displayed on the area excluding the area in which the received image is displayed and thus, a continuous drawing with respect to the area 152 in which the received image is displayed and the other areas cannot be performed.

Referring to FIG. 6B, if an image is received from an external device, and a user touch is sensed after the drawing icon 111 is selected, the processor 230 may process to display a drawing on the second layer. In this configuration, when a touch is initiated in an area which is not the area 152 in which the received image is displayed and is dragged to the area 152 in which the received image is displayed, the drawing is displayed on the area 152 in which the received image is displayed. Accordingly, the processor 230 may perform a continuous drawing with respect to the full screen including the area 152 in which the received image is displayed.

Figure 7:
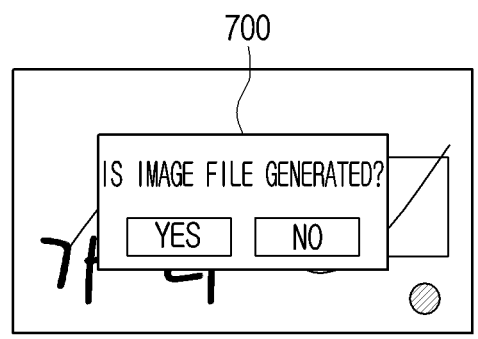
FIG. 7 is a view illustrating a user interface (UI) for identifying whether to generate an image file for an entire screen including a drawing.

FIG. 7 is a view illustrating a user interface (UI) for identifying whether to generate an image file with respect to the screen in which a drawing is performed.

After an image is received from an external device and a drawing icon is selected, the processor 230 may control the display 210 to perform a drawing by a user touch. Subsequently, when the drawing icon is selected again, the processor 230 may control the display 210 to display a UI 700 for identifying whether to generate an image file regarding the screen in which the drawing is performed as illustrated in FIG. 7.

If a user touch for generating an image file is input according to the UI 700, the processor 230 may generate one image file with the graphic, the image, the drawing image, etc. included in each layer and store the same in the memory 220. Accordingly, the processor 230 may display a question to ask the user whether an image file regarding the screen in which a drawing is displayed is generated by controlling the display 210 to display the UI 700.

The UI for identifying whether to generate an image file is not limited to the UI of FIG. 7, and may include an image file to be generated. In other words, when the drawing icon is selected again, the drawing image at the time of selecting the drawing icon, the video image and the graphic image are captured, and the captured images may be included in the UI. In this configuration, the user may know in advance information regarding the image file to be generated.

Figure 8:
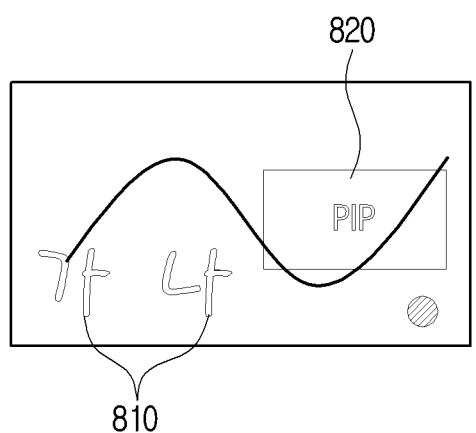
FIG. 8 is a view in which the transparency of an entire area is adjusted and displayed when a drawing icon is selected.

FIG. 8 is a view illustrating a screen in which the transparency of the screen displayed on the display 210 is adjusted when a drawing icon is selected.

When an image is received from an external device and a drawing icon is selected, the processor 230 may adjust the transparency of the entire area of the display 210, and control the display 210 to adjust and display the transparency of a graphic and a video included in the first layer.

When an input of selecting the drawing icon is sensed, the processor 230 may control the display 210 to adjust and display the transparency of a drawing image 810 displayed on the first layer and an image screen 820 received from an external device, and when a user touch is sensed, the processor 230 may process to display the drawing on the second layer.

When the transparency of the graphic and video excluding the drawing image displayed on the second layer is adjusted and displayed, the user may easily identify the trajectory in which the drawing is displayed.

In addition, not only when the drawing icon is selected, but also when the drawing icon is not selected, the transparency of the screen displayed on the display 210 may be adjusted according to a user input. In other words, even when the drawing icon is not selected and the processor 230 processes to display the drawing on the first layer, the transparency of the remaining graphic and video excluding the drawing image may be adjusted.

In addition, if a background screen is included in a writing screen provided by an electronic apparatus, when the drawing icon is selected, the processor 230 may adjust the transparency of the background screen.

Figure 9A:
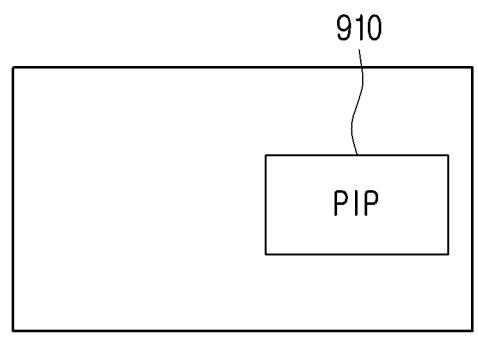
FIG. 9A is a view illustrating a received image in a form of Picture In Picture (PIP)
Figure 9B:
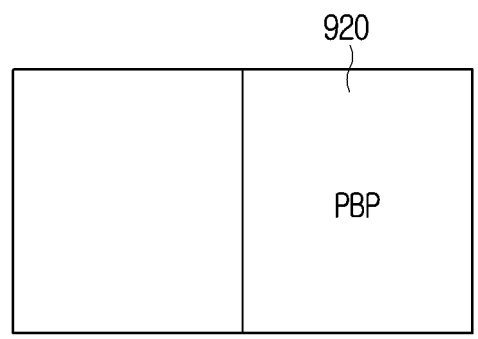
FIG. 9B is a view illustrating a received image in a form of Picture By Picture (PBP)

FIG. 9A is a view illustrating an image received from an input device in the form of Picture in Picture (PIP), and FIG. 9B is a view illustrating an image received from an input device in the form of Picture by Picture (PBP).

When an image is received from an external device, the processor 230 may control the display 210 to display the received image screen on one area 910 of the display 210 in the form of PIP.

In other words, if the received image is displayed on one area 910 of the display 210 in the form of PIP, a screen provided by the electronic apparatus may be displayed on the remaining area.

If the drawing icon is selected while the received image screen is displayed on one area 910 of the display 210, the drawing may be displayed with respect to the full screen when a touch is initiated in an area which is not the area in which the received image is displayed and is dragged to the area in which the received image is displayed. Accordingly, when the drawing icon is selected, the processor 230 may perform a continuous drawing with respect to the entire screen.

In addition, when an image is received from an external device, the processor 230 may control the display 210 to display the received image screen on one area 920 of the display in the form of PBP.

In other words, if the received image is displayed on one area 920 of the display 210 in the form of PBP, the screen provided by the electronic apparatus may be reduced and displayed or only a part of the screen may be displayed on the remaining area.

If the drawing icon is selected while the received image screen is displayed on one area 920 of the display 210 in the form of PBP, the drawing may be displayed on the full screen when a touch is initiated in an area which is not the area 920 in which the received image is displayed and is dragged to the area 920 in which the received image is displayed.

Figure 10A:
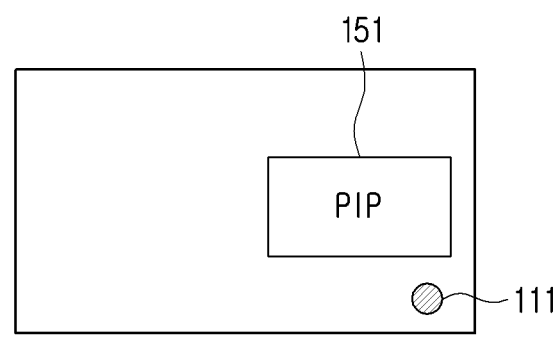
FIG. 10A is a view illustrating a configuration in which a drawing icon is displayed outside a received image.

FIG. 10A is a view illustrating a configuration in which a drawing icon is displayed outside a received image.

According to an embodiment, when a user input for receiving an image from an external device is received, the processor 230 may process to display the drawing icon 111 outside the area 151 in which the received image is displayed.

Figure 10B:
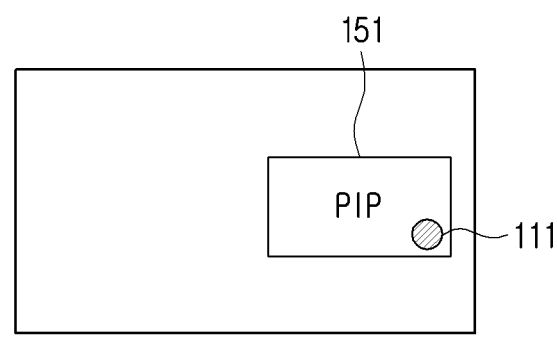
FIG. 10B is a view illustrating a configuration in which a drawing icon is received inside a received image.

FIG. 10B is a view illustrating a configuration in which a drawing icon is displayed inside a received image.

According to an embodiment, if a user input for receiving an image from an external device is received, the processor 230 may process to display the drawing icon 111 inside the area 151 in which the received image is displayed.

Figure 11:
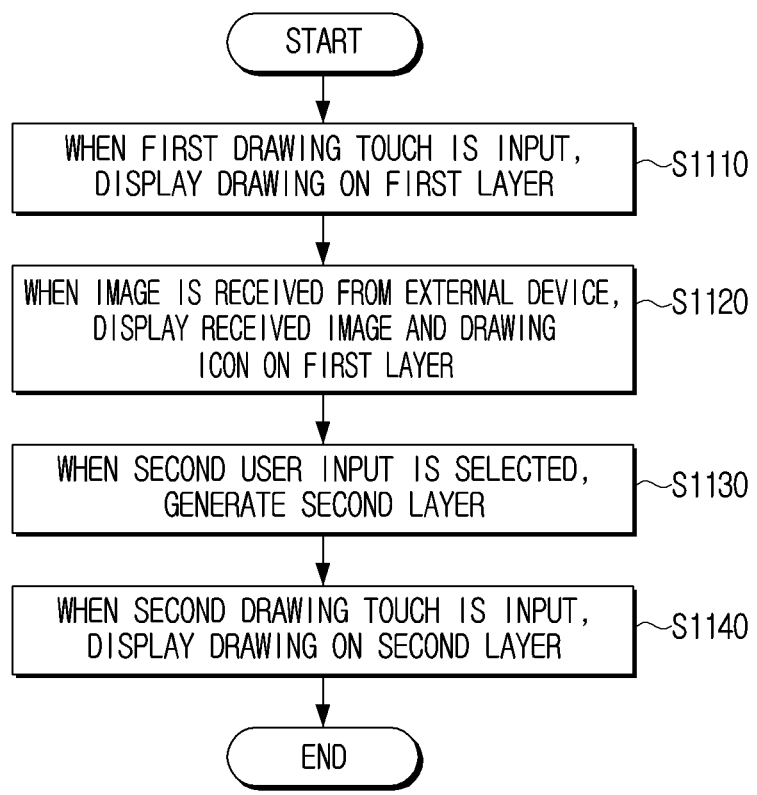
FIG. 11 is a flowchart illustrating a method of controlling an electronic apparatus according to an embodiment.

FIG. 11 is a flowchart illustrating a method of controlling an electronic apparatus according to an embodiment.

When a user's first drawing touch is input, the electronic apparatus 200 may display a drawing according to the first drawing touch input on the first layer for displaying a graphic (S1110). The first layer may include a video, a graphic and a drawing image. Here, the graphic means all graphics except a video included in an image, and may include an icon, a menu UI, an image, and the like.

If an image is received from an external device, the electronic apparatus 200 may display the received image and a drawing icon on the first layer (S1120). The drawing icon is an icon for performing a drawing according to the user's drawing touch input on the received image.

When a user input for generating a second layer is selected, the second layer for performing a drawing may be generated (S1130). Subsequently, if the user's second drawing touch is input, a drawing may be displayed on the second layer according to the second drawing touch input (S1140) and the processing may be terminated. If the drawing icon is not selected and the drawing is displayed, the drawing is not displayed on the received image and thus, a continuous drawing with respect to the entire screen cannot be performed.

Figure 12:
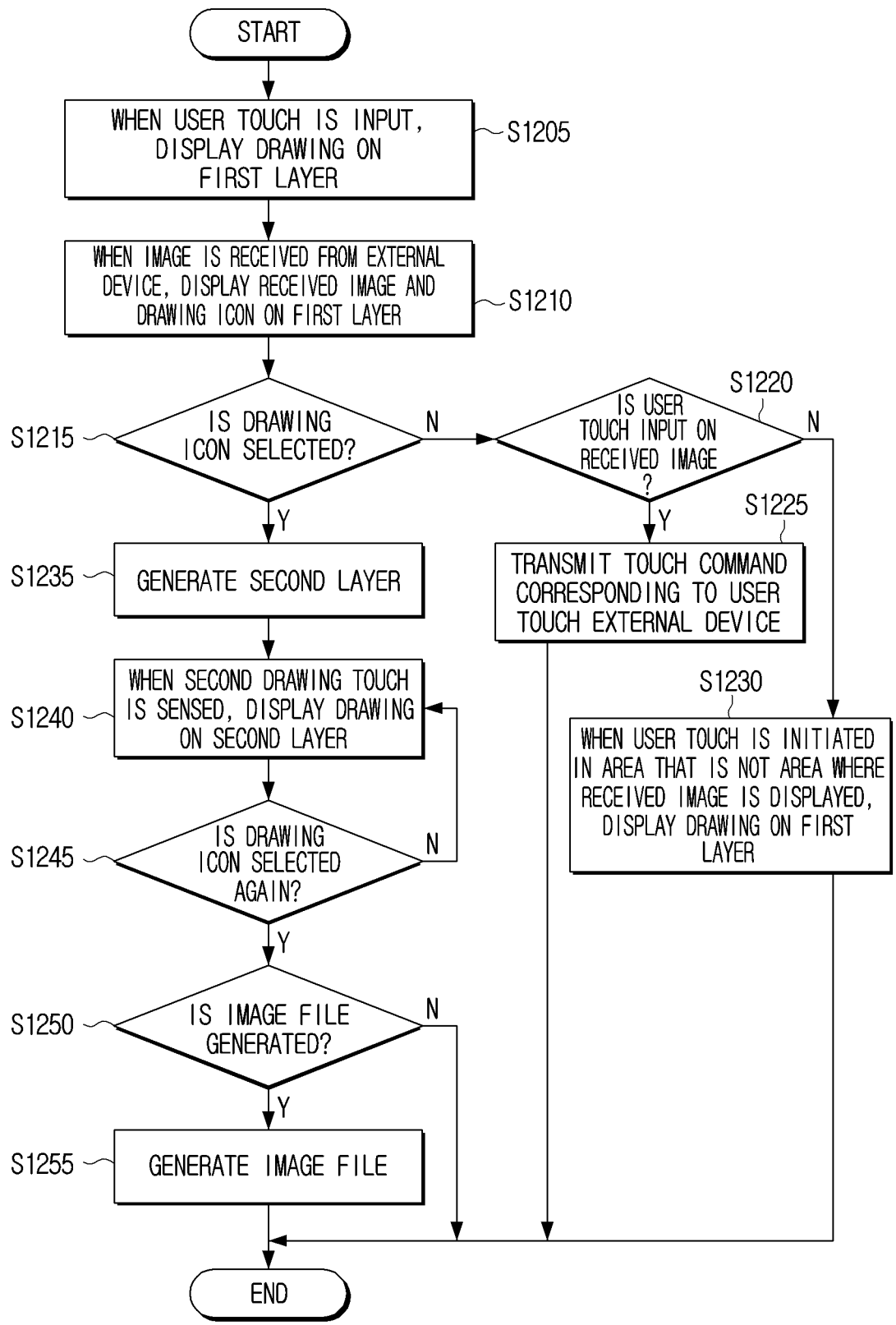
FIG. 12 is a flowchart illustrating a method of controlling an electronic apparatus according to an embodiment.

FIG. 12 is a flowchart illustrating a method of controlling an electronic apparatus according to an embodiment.

First, when a user touch is input, the electronic apparatus 200 may display a drawing on the first layer (S1205).

If a user input for receiving an image from an external device is received and the image is received from the external device, the electronic apparatus 200 may display the received image and the drawing icon on the first layer (S1210). Subsequently, if the drawing icon is not selected (S1215-N), the electronic apparatus 200 determines whether a user touch is input on the received image (S1220).

If a user touch is input on the received image (S1220-Y), the electronic apparatus 200 may transmit a touch command corresponding to the user touch to the external device (S1225) and terminate the processing.

If a user touch is not initiated on the received image (S1220-N) and a user touch is initiated on an area which is not the area in which the received image is displayed, the electronic apparatus 200 may display a drawing on the first layer (S1230) and terminate the processing. In other words, when the drawing icon is not selected and a user touch is input on the received image, the electronic apparatus 200 may perform a touch command, and when a user touch is input on an area which is not the area in which the received image is displayed, the electronic apparatus 200 may display a drawing on the first layer.

When the drawing icon is selected (S1215-Y), the electronic apparatus 200 may generate the second layer (S1235). Subsequently, if the user's second drawing touch is sensed, the electronic apparatus 200 may display a drawing on the second layer according to the second drawing touch (S1240).

If the drawing icon is not selected again (S1245-N) and the second drawing touch is continuously sensed, the electronic apparatus 200 may process to continuously display the drawing on the second layer (S1240). In this configuration, according to an embodiment, the first layer or the second layer may be selectively scrolled according to the user's scroll input and the drawing may be displayed.

If the drawing icon is selected again (S1245-Y), the electronic apparatus 200 may identify whether to generate an image file with respect to the entire screen including the drawing (S1250). In addition, the electronic apparatus 200 may identify whether an image file is generated by displaying a UI for identifying whether to generate an image file. When an image file is generated (S1250-Y), the electronic apparatus 200 may generate an image file with respect to the entire screen including the drawing (S1255) and terminate the processing. When an image file is not generated (S1250-N), the processing may be terminated immediately.

Meanwhile, according to an embodiment, the above-described various embodiments of the disclosure may be implemented as software including instructions that can be stored in machine-readable storage media, which can be read by machine (e.g.: computers). The machine refers to an apparatus that calls instructions stored in a storage medium, and can operate according to the called instructions, and the apparatus may include an electronic apparatus (e.g.: an electronic apparatus (A)) according to the embodiments described in the disclosure. When an instruction is executed by a processor, the processor may perform a function corresponding to the instruction by itself, or by using other components under its control. The instruction may include a code that is generated or executed by a compiler or an interpreter. The storage medium that is readable by machine may be provided in the form of a non-transitory storage medium. Here, the term 'non-transitory' only means that a storage medium does not include signals, and is tangible, but does not indicate whether data is stored in the storage medium semi-permanently or temporarily.

In addition, according to an embodiment of the disclosure, the method according to the various embodiments described above may be provided while being included in a computer program product. A computer program product refers to a product, and it can be traded between a seller and a buyer. The computer program product can be distributed on-line in the form of a storage medium that is readable by machines (e.g.: a compact disc read only memory (CD-ROM)), or through an application store (e.g.: play store TM). In the configuration of on-line distribution, at least a portion of the computer program product may be stored in a storage medium such as the server of the manufacturer, the server of the application store, and the memory of the relay server at least temporarily, or may be generated temporarily Also, each of the components according to the aforementioned various embodiments (e.g.: a module or a program) may consist of a singular object or a plurality of objects. In addition, among the aforementioned corresponding sub components, some sub components may be omitted, or other sub components may be further included in the various embodiments. Generally or additionally, some components (e.g.: a module or a program) may be integrated as an object, and perform the functions that were performed by each of the components before integration identically or in a similar manner. Operations performed by a module, a program, or other components according to the various embodiments may be executed sequentially, in parallel, repetitively, or heuristically. Or, at least some of the operations may be executed in a different order, or omitted, or other operations may be added While embodiments of the disclosure have been shown and described, the disclosure is not limited to the aforementioned specific embodiments, and it is apparent that various modifications can be made by those having ordinary skill in the art to which the disclosure belongs, without departing from the gist of the disclosure as claimed by the appended claims, and such modifications are not to be interpreted independently from the technical idea or prospect of the disclosure.

What is claimed is:

1. An electronic apparatus comprising:
    a display;
    a memory configured to store at least one instruction; and
    a processor configured to execute the at least one instruction, wherein the processor is configured to, by executing the at least one instruction:
        based on a first drawing touch input, to control the display to display a first drawing according to the first drawing touch input on a first layer for displaying a graphic before a video image is received from an external device,
        based on a first user input for receiving the video image from the external device, to control the display to display the video image and the first drawing on the first layer,
        based on a second user input for generating a second layer, to generate the second layer for performing a second drawing, wherein the second layer is overlaid above the first layer,
        based on a second drawing touch input, to control the display to display the second drawing on the second layer above the first layer according to the second drawing touch input while displaying the first drawing and the video image on the first layer.

2. The electronic apparatus as claimed in claim 1, wherein the processor executing the at least one instruction is configured to, based on the first drawing touch input on an area in which the video image is not displayed before the second user input is received, control the display to display the first drawing on the first layer according to the first drawing touch input.

3. The electronic apparatus as claimed in claim 1, further comprising:
    a communicator,
        wherein the processor executing the at least one instruction is configured to, based on a user touch input on the video image before the second user input, control the communicator to transmit a touch command corresponding to the user touch input to the external device.

4. The electronic apparatus as claimed in claim 1, wherein the processor executing the at least one instruction is configured to, based on the second drawing touch input on the video image after the second user input, control the display to display the second drawing on the video image.

5. The electronic apparatus as claimed in claim 1, wherein the second layer is stored in a buffer of the memory.

6. The electronic apparatus as claimed in claim 1, wherein the processor executing the at least one instruction is configured to, based on a third user input for generating an image file after the second user input, generate the image file for an entire screen of the display including the first layer and the second layer.

7. The electronic apparatus as claimed in claim 1, wherein the processor executing the at least one instruction is configured to, based on a third user input for generating an image file after the second user input, control the display to display a user interface for identifying whether to generate the image file regarding an entire screen of the display including the second drawing.

8. The electronic apparatus as claimed in claim 1, wherein the processor executing the at least one instruction is configured to, based on the second user input, control the display to adjust transparency of an entire area of the display.

9. The electronic apparatus as claimed in claim 1, wherein the processor executing the at least one instruction is configured to control the display the video image on one area of the display in a form of one of Picture In Picture (PIP) or Picture By Picture (PBP).

10. The electronic apparatus as claimed in claim 1, wherein the processor executing the at least one instruction is configured to, based on the first user input for receiving the video image from the external device, to control the display to display the video image with a drawing icon on the first layer, wherein the second user input is a user input for selecting the drawing icon.

11. A method of controlling an electronic apparatus, the method comprising:
    based on a first drawing touch input, displaying a first drawing according to the first drawing touch input on a first layer for displaying a graphic before a video image is received from an external device;
    based on a first user input for receiving the video image from the external device, displaying the video image and the first drawing on the first layer;
    based on a second user input for generating a second layer, generating the second layer for performing a second drawing, wherein the second layer is overlaid above the first layer; and based on a second drawing touch input, displaying the second drawing on the second layer above the first layer according to the second drawing touch input while displaying the first drawing and the video image on the first layer.

12. The method as claimed in claim 11, further comprising:

based on the first drawing touch input in an area in which the video image is not displayed before the second user input is received, displaying the first drawing on the first layer according to the first drawing touch input.

13. The method as claimed in claim 11, further comprising:

based on a user touch input on the video image before the second user input, transmitting a touch command corresponding to the user touch input to the external device.

14. The method as claimed in claim 11, wherein the displaying the second drawing on the second layer comprises, based on the second drawing touch input on the video image after the second user input, displaying the second drawing on the video image.

15. The method as claimed in claim 11, wherein the second layer is stored in a buffer.

16. The method as claimed in claim 11, further comprising:

based on a third user input for generating an image file after the second user input, generating the image file regarding an entire screen including the first layer and the second layer.

17. The method as claimed in claim 11, further comprising:

based on a third user input for generating an image file after the second user input, displaying a UI for identifying whether to generate the image file regarding an entire screen including the second drawing.

18. The method as claimed in claim 11, further comprising:

based on the second user input, adjusting transparency of an entire area of a display.

19. The method as claimed in claim 11, wherein the video image is displayed one area of a display in a form of one of Picture In Picture (PIP) or Picture By Picture (PBP).

20. The method as claimed in claim 11, wherein the displaying the video image and the first drawing further comprises, based on the first user input for receiving the video image from the external device, displaying the video image and the first drawing with a drawing icon on the first layer, wherein the second user input is a user input for selecting the drawing icon.

* * * * *